United States Patent Office 3,446,464
Patented May 27, 1969

3,446,464
METHOD AND APPARATUS FOR REDUCING SONIC WAVES AND AERODYNAMIC DRAG
William A. Donald, 5 La Rue Drive,
Huntington, N.Y. 11743
Filed Mar. 9, 1967, Ser. No. 621,982
Int. Cl. B64c 1/38, 3/38
U.S. Cl. 244—130        11 Claims

ABSTRACT OF THE DISCLOSURE

Sonic waves and aerodynamic drag on air frames are reduced by applying an electric field to the air in the vicinity of the leading edge of the air frames. For this purpose, electrodes are provided adjacent the leading edge and at a location rearwardly of the leading edge and a difference of potential is applied to the electrodes to establish an electric field between them. The field may be uniform with potentials of opposite polarity applied to the forward and rearward electrodes or may be nonuniform with a field strength that increases from the forward towards the rearward electrodes.

---

Figure 1:
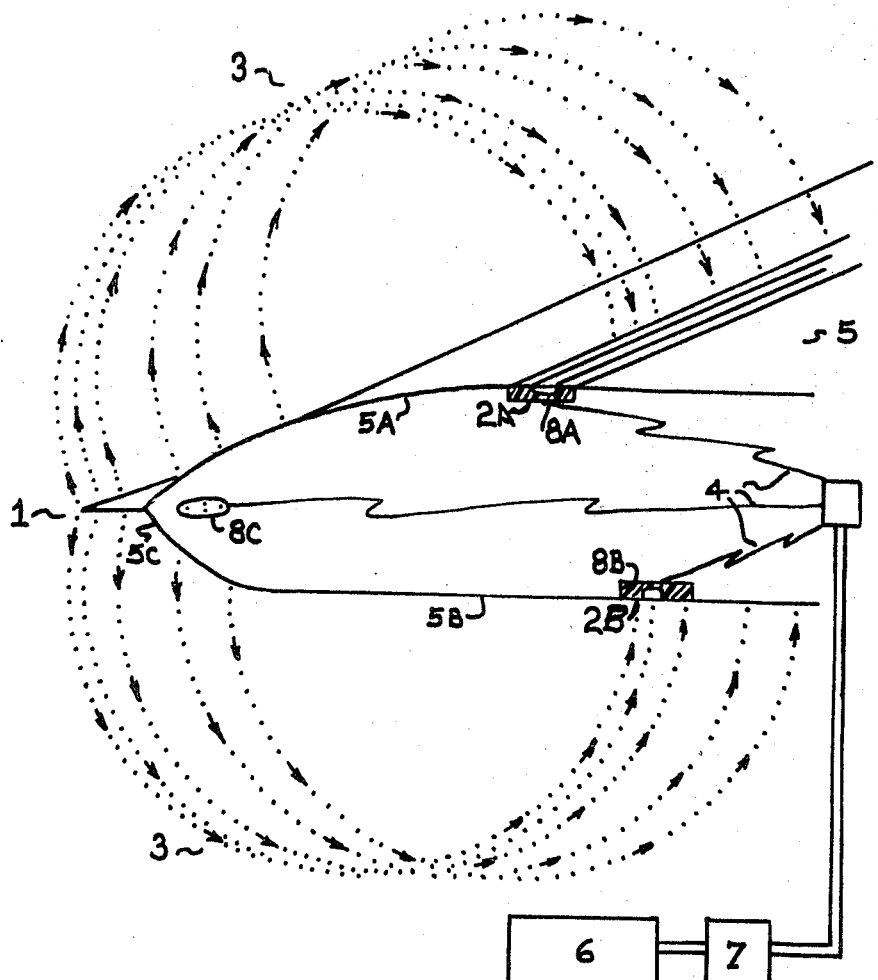

The present invention relates to a method of reducing sonic waves and aerodynamic drag on aerodynamic members, for example the wings of aircraft, and to equipment for carrying out such method.

When an aircraft is moving through the air at a speed exceeding the speed of sound, sonic waves build up on the leading edges of the wing and other aerodynamic surfaces of the aircraft, producing a phenomenon known as "sonic boom." This is objectionable not only because of resulting shock effects producing objectionable noise and doing physical damage to structures on the ground, but also because it results in an aerodynamic drag effect which retards the speed of the aircraft and requires more power to propel it through the air.

It is an object of the present invention to provide a method and equipment for reducing sonic waves and aerodynamic drag in an effective yet simple and economical manner.

In accordance with the present invention, one or more electrodes are applied adjacent the leading edge of a wing or other aerodynamic surface of an aircraft and other electrodes are provided on the wing or other aerodynamic surface at a position rearwardly of the forward edge. For convenience, the electrodes at the leading edge are referred to as "forward" electrodes and the electrodes positioned rearwardly of the leading edge are referred to as "rearward" electrodes. When the aircraft is in flight, different electrical potentials are applied to the forward and rearward electrodes to establish an electric field between the electrodes. By virtue of the position of the electrodes, this field is applied to the air in a zone in the vicinity of the leading edge of the wing or other member. The strength and direction of the electric field are selected so as to exert on air particles in the field a force leading them from the vicinity of the forward electrodes toward the rearward electrodes. This movement of air particles reduces the buildup of air pressure in front of the leading edge that results in sonic waves and aerodynamic drag.

The force exerted on air particles to move them from a position in front of the leading edge to a position rearwardly of the leading edge is attributable to one or both of electrical effects designated respectively electrophoresis and dielectrophoresis. The effect referred to as electrophoresis arises from the electrostatic attraction of charged electrodes for charged particles. In order to produce this effect, potentials of opposite polarity are applied respectively to the forward and rearward electrodes. Air particles in the vicinity of the forward electrodes are given an electric charge and are thereupon attracted toward the rearward electrodes by electrostatic attraction. The effect is observable even with relatively low voltage gradients. The electric field may be either uniform or divergent.

Movement of the air particles by the effect referred to as dielectrophoresis requires a nonuniform field and results from movement of the particles from a weaker toward a stronger field. To produce this effect, the configuration of the electrodes and the potentials applied to them are selected so as to provide a weaker field adjacent the forward electrodes and a stronger field adjacent the rearward electrodes. A highly divergent field and relatively high field strength, for example 100 v. or more per centimeter, are required in order to produce effective movement of the air particles in a direction rearwardly from the leading edge of the wing. The effect is not dependent on field direction and hence either direct or alternating current can be used.

Figure 2:
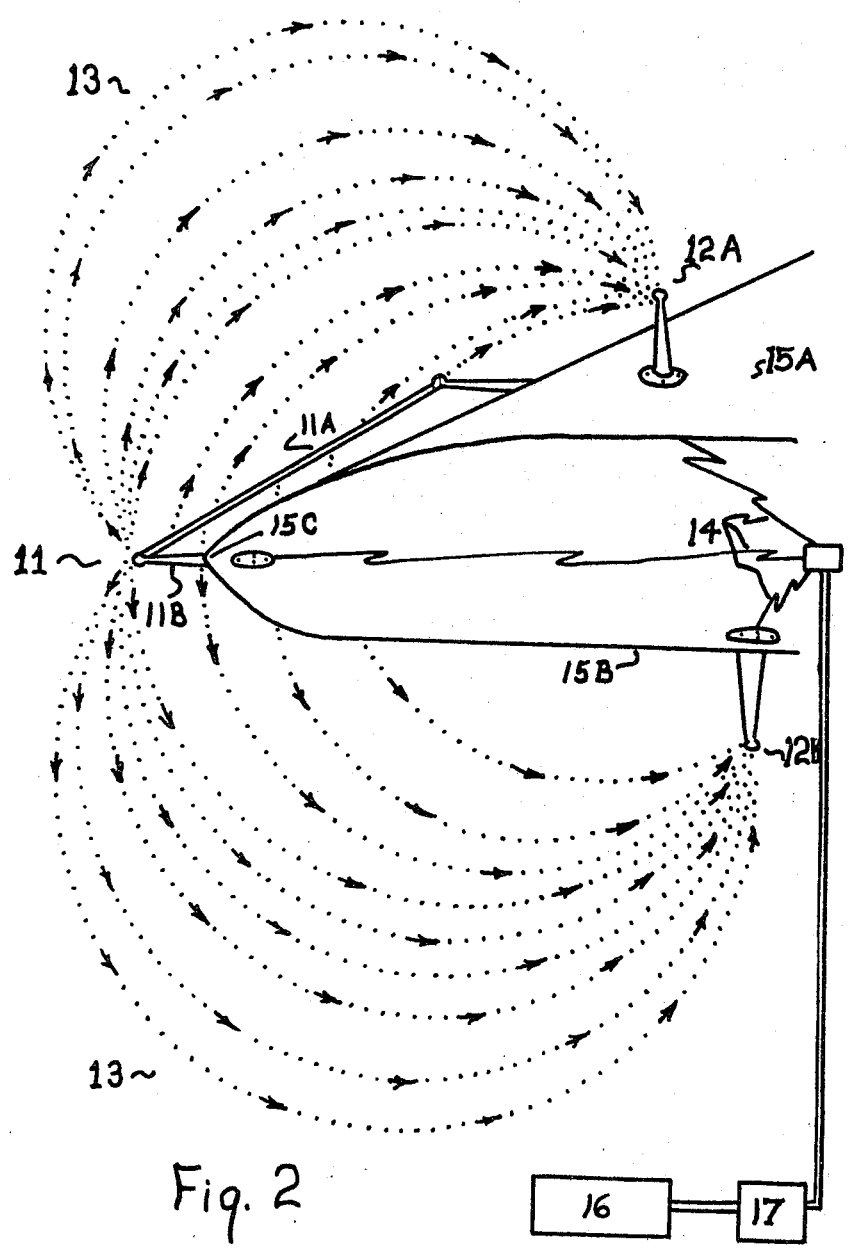
Figure 3:
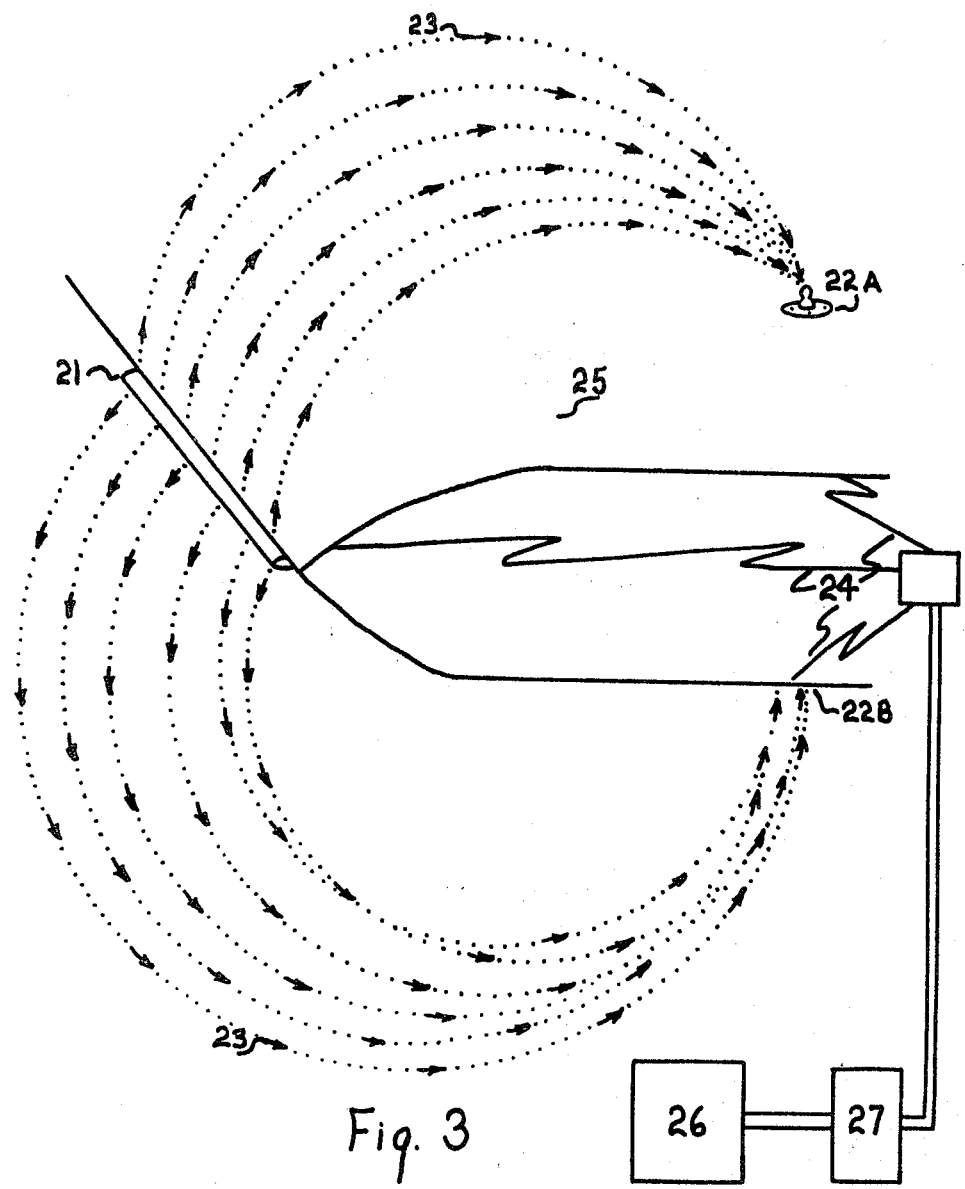

The invention will be more fully understood from the following description of preferred embodiments illustrated by way of example in the accompanying drawings in which:

FIG. 1 is a schematic perspective view illustrating the application of the invention to an airplane wing and, FIGS. 2 and 3 are similar views illustrating other embodiments.

In the embodiment illustrated by way of example in FIG. 1, an electrode 1 is provided on the leading edge 5C of an aircraft wing 5 of which only the forward portion is shown in the drawing. The electrode 1 is shown as extending continuously along the leading edge although it may, if desired, be divided into a plurality of segments. As illustrated in the drawing, the forward electrode 1 comprises a metal plate which projects forwardly of the leading edge 5C and is parallel to the edge.

Other electrodes 2A and 2B are provided on the upper and lower surfaces 5A and 5B of the wing is positions rearwardly of the leading edge. The positions of the rearward electrodes 2A and 2B are selected so as to be rearwardly of the zone in which a pressure wave builds up on the forward edge portion of the wing during high speed flight. On wing configurations in which the maximum thickness of the wing is located a short distance back of the leading edge, it is desirable to have the rear electrodes 2A and 2B located at or near the position of the maximum thickness. As illustrated in the drawing, each of the rearward electrodes 2A, 2B comprises a conductive strip extending in a spanwise direction of the wing and approximately flush with the wing surfaces 5A and 5B, respectively. The strips, if desired, may be divided into a plurality of separate sections.

The forward electrode 1 and the rearward electrodes 2A and 2B are electrically insulated from one another and for this purpose either the forward electrode or the rearward electrodes or both are insulated from the wing structure. Rearward electrodes 2A and 2B are shown mounted in insulating material 8A, 8B. The forward electrode 1 is likewise insulated from the wing by a suitable insulating mount 8C.

In order to produce an electric field 3 between the forward and rearward electrodes, means are provided for applying different electrical potentials to the electrodes. Thus, the electrodes are shown connected by wires or other conductors 4 to voltage generating means 6 provided with a suitable control unit 7. The voltage generator 6 may be a rotating or other electromechanical direct current generator or a voltage generator of the electronic type in which a high voltage alternating current is produced and then rectified. The control unit 7 preferably includes an on-off switch and also means for increasing and decreasing the potential applied to the electrodes. Preferably, means is provided for separately controlling the potential difference between the forward electrode 1 and the upper rearward electrode 2A and the potential difference between the forward electrode 1 and the rearward lower electrode 2B.

In the embodiment illustrated in FIG. 1, the strength of the electric field 3 is essentially uniform and hence movement of air particles from a zone adjacent the forward electrode 1 in front of the leading edge to a position adjacent the rearward electrodes 2A and 2B rearwardly of the leading edge is effected by electrophoresis. Potentials of opposite polarity are applied respectively to the forward electrode 1 and rearward electrodes 2A, 2B. For example, a negative potential is applied to the forward electrode and positive potentials are applied to the rearward electrodes. Hence, air particles in the vicinity of the forward electrode 1 in front of the leading edge of the wing receive a negative charge and are thereupon attracted toward the positively charged rearward electrodes 2A and 2B thereby producing movement of the air particles from a zone in front of the forward edge of the wing to a position rearwardly of the forward edge. Control of the potential difference between the forward electrode 1 and upper rearward electrode 2A and the potential difference between the forward electrode 1 and the lower rearward electrode 2B provides means for controlling flow of air over and under the wing, respectively.

In the embodiment illustrated in FIG. 2, a forward electrode 11 mounted on the leading edge of a wing 15 is shown as comprising a conductive wire or bar 11A extending between insulating supports 11B. While only one section of a forward electrode is illustrated in the drawing, it will be understood that the wing is preferably provided with a series of such sections or with a continuous electrode extending along the leading edge of the wing and located ahead of the leading edge.

Rearward electrodes 12A and 12B are located respectively on the upper and lower surfaces 15A and 15B of the wing at selected locations rearward of the leading edge 15C. The rearward electrodes 12A, 12B are essentially point electrodes comprising for example small metal knobs mounted on insulating supports. The upper rear electrode 12A is shown projecting upwardly above the upper surface 15A of the wing while the lower rearward electrode 12B is shown projecting downwardly from the lower surface 15B of the wing. The location of the rearward electrode with respect to the leading edge of the wing is essentially as described with reference to FIG. 1. While only one rearward electrode is shown on each of the wing surfaces, it will be understood that there will ordinarily be a series of such electrodes disposed along lines extending spanwise of the wing. The distance between successive electrodes in a spanwise direction should preferably be at least approximately as great as the distance between the forward electrode and the rearward electrodes.

As in the embodiment of FIG. 1, the forward electrode 11 and rearward electrodes 12A and 12B, shown in FIG. 2, are connected by suitable wires or conductors 14 to voltage generating means 16 provided with a suitable control unit 17. The voltage generating means and control unit are essentially the same as for the embodiment of FIG. 1 except that with the configuration shown in FIG. 2, either alternating current or direct current can be used.

It will be seen that since the forward electrode is elongate while the rearward electrodes 12A, 12B are essentially point electrodes, the effective area of the forward electrode is much greater than that of the rearward electrodes and hence the electric field 13 between the forward electrode and each of the rearward electrodes is highly divergent. Hence, the field increases in strength from the forward electrode toward the rearward electrodes. By reason of the divergent field thus produced, air particles in the zone adjacent the forward electrode in front of the leading edge of the wing, are caused to move from the weaker field toward the stronger field adjacent the rearward electrodes. There is thus produced an air flow counter-acting the buildup of a pressure wave in front of the leading edge of the wing.

The control unit 17 preferably provides means for controlling not only the respective potential differences between the forward electrode 11 and the rearward electrodes 12A and 12B on the upper and lower surfaces of the wing respectively, but also to control the potential differences between successive sections of the forward electrode and corresponding rearward electrodes. Thus, different potential differences can be provided along different portions of the wing.

In FIG. 3 there is shown another embodiment of the invention which is similar to that of FIG. 2 except that the forward electrode in FIG. 1 and rearward electrodes 22A and 22B are more streamlined so as to offer less aerodynamic resistance. Thus, it will be seen that the forward electrode 21 is faired into the leading edge of the wing while the rearward electrodes 22A and 22B project only slightly from the surfaces of the wing. While only one section of a forward electrode and only two rearward electrodes are shown in the drawing, it will be understood that this configuration is repeated along the spanwise extent of the wing. The electrodes are suitably insulated from the wing and are connected by wires or other conductors 24 to a voltage generating means 26 provided with a suitable control unit 27 as previously described.

Since the forward electrode 21 is elongate while the rearward electrodes 22A, 22B are essentially point electrodes, the electric field 23 produced when different potentials are applied to the electrodes is highly divergent and increases in strength from the forward electrode toward the rearward electrodes. Hence, a force is exerted on air particles in the electric field to move them from a zone adjacent the forward electrode 21 in front of the leading edge of the wing toward the rearward electrodes 22A and 22B located rearwardly of the leading edge. The resulting air flow counteracts the buildup of a sonic wave or pressure wave in front of the leading edge of the wing.

While the invention has been described as applied to wings of aircraft, it will be understood that it is likewise applicable to other aerodynamic surfaces such as the fuselage or control surfaces of aircraft and the surfaces of missiles or other aerodynamic structures. The features of the several embodiments illustrated in the drawings and herein described are interchangeable insofar as they are mutually compatible.

What I claim and desire to secure by letters patent is:

1. A method of reducing the production of shock waves by an aircraft travelling at supersonic speed and having an aerodynamic surface having a leading edge and a trailing edge, which comprises providing on said surface an arrangement of electrodes consisting in a direction chordwise of said surface of a single pair of electrodes, said pair of electrodes consisting of a forward electrode adjacent said leading edge and a rearward electrode spaced rearwardly of said leading edge and forwardly of said trailing edge, providing said aircraft with a voltage generator having opposite terminals, connecting one of said terminals solely to said forward electrode and connecting the other of said terminals solely to said rearward electrode to apply the entire electrical potentials of said generator across said single pair of electrodes while said aircraft is moving through the air at supersonic speed to establish an electric field between said single pair of electrodes and thereby apply the full force of said field to air in a zone in the vicinity of said leading edge, said field being selected in strength and direction to exert on air particles in said field an electrical force to move them from in front of said leading edge and thereby reduce the development of sonic waves in front of said leading edge.

2. A method according to claim 1, in which the field applied to said electrodes is nonuniform and increases in strength from said forward electrode toward said rearward electrode to exert a force on air particles in said field to move them from a weaker field adjacent said forward electrode toward a stronger field adjacent said rearward electrode.

3. A method according to claim 1, in which potentials of opposite polarity are applied respectively to said forward and rearward electrodes to charge air particles adjacent said forward electrode with one polarity and to attract them toward the rearward electrode of the opposite polarity.

4. Equipment for reducing the production of shock waves by an aircraft travelling at supersonic speed, comprising in combination with an aircraft wing having a leading edge, a surface extending rearwardly from said leading edge, an arrangement of electrodes consisting in a direction chordwise of said surface of said wing of a single pair of electrodes, said pair of electrodes consisting of a forward electrode adjacent said leading edge and a rearward electrode adjacent said surface and spaced a selected distance rearwardly from said forward electrode and forward of said trailing edge, means for generating a high electrical potential, said potential generating means having opposite terminals, means for connecting one of said terminals solely to said forward electrode and connecting the other of said terminals solely to said rearward electrode to apply the full force of said potential between said electrodes while said aircraft is moving through the air at supersonic speed to establish an electric field between said electrodes and thereby apply said field corresponding to the entire potential of said generating means to air in a zone in the vicinity of said leading edge, said field being concentrated in the vicinity of said leading edge and being of a strength and direction to exert on air particles in said field a force moving them from the vicinity of said forward electrode toward said rearward electrode and thereby reducing, the build-up of sonic waves on the leading edge of said wing.

5. Equipment according to claim 4, comprising means for controlling the voltage supplied by said voltage generating means to said electrodes.

6. Equipment according to claim 5, in which said controlling means includes means for increasing and decreasing the potential difference between said electrodes.

7. Equipment according to claim 4, in which said forward electrode has a greater effective area than said rearward electrode to provide a nonuniform field which increases in field strength toward said rearward electrode to exert a force on air particles in said field to move them in a direction of increasing field strength.

8. Equipment according to claim 7, in which said forward electrode comprises a strip of conductive material insulated from said wing and extending spanwise along said leading edge and said rearward electrode comprises essentially a knob electrode insulated from said wing.

9. Equipment according to claim 4, in which said voltage generating means is designed to apply potentials of opposite polarity to said forward and rearward electrodes to charge air particles adjacent said forward electrode with one polarity and to attract them toward the rearward electrode of the opposite polarity.

10. Equipment according to claim 9, in which said voltage generating means is designed to apply a negative potential to said forward electrode and a positive potential to said rearward electrode.

11. Equipment according to claim 4 in which said rearward electrode is located at or near the location of the maximum thickness of the wing.

References Cited

UNITED STATES PATENTS 2,946,541  7/1960  Boyd _____ 244—42
3,095,163  6/1963  Hill _____ 244—12

MILTON BUCHLER, *Primary Examiner.*

J. E. PITTENGER, *Assistant Examiner.*

U.S. Cl. X.R.

244—42